(12) United States Patent
Wang et al.

(10) Patent No.: US 11,586,088 B2
(45) Date of Patent: Feb. 21, 2023

(54) DISPLAY SUBSTRATE, DISPLAY PANEL AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Xue Wang, Beijing (CN); Xiao Wang, Beijing (CN); Yan Yan, Beijing (CN); Tingting Wang, Beijing (CN); Yaya Qi, Beijing (CN); Xiaoying Li, Beijing (CN); Zhiqiang Ma, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/599,024

(22) PCT Filed: Feb. 26, 2021

(86) PCT No.: PCT/CN2021/078137
§ 371 (c)(1),
(2) Date: Sep. 28, 2021

(87) PCT Pub. No.: WO2021/170083
PCT Pub. Date: Sep. 2, 2021

(65) Prior Publication Data
US 2022/0187666 A1  Jun. 16, 2022

(30) Foreign Application Priority Data
Feb. 28, 2020 (CN) .......................... 202010130210.8

(51) Int. Cl.
*G02F 1/1362* (2006.01)
*G02F 1/1368* (2006.01)
(Continued)

(52) U.S. Cl.
CPC ...... *G02F 1/136286* (2013.01); *G02F 1/1368* (2013.01); *G02F 1/13629* (2021.01);
(Continued)

(58) Field of Classification Search
CPC ............. G02F 1/1333; G02F 1/133345; G02F 1/1343; G02F 1/134309; G02F 1/134318;
(Continued)

(56) References Cited

U.S. PATENT DOCUMENTS 9,461,075 B2    10/2016  Yu et al.
10,082,715 B2*   9/2018  Okada ............... G02F 1/136227
(Continued)

FOREIGN PATENT DOCUMENTS

CN    102903675 A    1/2013
CN    104090401 A    10/2014
(Continued)

OTHER PUBLICATIONS

China Patent Office, First Office Action dated Apr. 15, 2022, for corresponding Chinese application 202010130210.8.

*Primary Examiner* — Thoi V Duong
(74) *Attorney, Agent, or Firm* — Houtteman Law LLC (57) ABSTRACT

The present disclosure provides a display substrate, a display panel and a display apparatus, belonging to the field of display technology. The display substrate includes a base, a plurality of common electrodes and a plurality of common electrode lines, the common electrodes are distributed on the base in an array, the common electrode lines extend along a row direction, and each common electrode line is connected to a corresponding row of common electrodes. The common electrode line is connected to the common electrode through a conductive connection portion, and the conductive connection portion includes conductive structures stacked on top of one another in a plurality of layers. The display
(Continued)

substrate can reduce the resistance between the common electrode and the common electrode line, thereby reducing the voltage difference between the common electrodes in the display substrate and improving the uniformity of the common voltage therein.

20 Claims, 7 Drawing Sheets

(51) Int. Cl.
  *G02F 1/1333* (2006.01)
  *G02F 1/1343* (2006.01)
(52) U.S. Cl.
  CPC .. *G02F 1/133345* (2013.01); *G02F 1/134309* (2013.01); *G02F 1/134318* (2021.01); *G02F 1/136227* (2013.01)
(58) Field of Classification Search
  CPC ............. G02F 1/134363; G02F 1/1362; G02F 1/136227; G02F 1/136286; G02F 1/3629; G02F 1/1368
  See application file for complete search history.

(56) References Cited

U.S. PATENT DOCUMENTS

| | | | |
|---|---|---|---|
| 10,146,096 | B2 | 12/2018 | Tomioka et al. |
| 10,488,710 | B2 | 11/2019 | Guo et al. |
| 2007/0002246 | A1 | 1/2007 | Chang et al. |
| 2015/0160521 | A1 | 6/2015 | Tomioka et al. |
| 2015/0355516 | A1 | 12/2015 | Imai et al. |
| 2016/0252793 | A1* | 9/2016 | Cheng ............... H01L 29/78633 257/72 |
| 2016/0377945 | A1* | 12/2016 | Cai .................. G02F 1/136286 257/72 |
| 2017/0271370 | A1* | 9/2017 | Wang .................. H01L 27/1244 |
| 2017/0307921 | A1* | 10/2017 | Feng ..................... G02F 1/1343 |
| 2018/0088373 | A1 | 3/2018 | Guo et al. |

FOREIGN PATENT DOCUMENTS

| | | |
|---|---|---|
| CN | 104201178 A | 12/2014 |
| CN | 104698704 A | 6/2015 |
| CN | 104885007 A | 9/2015 |
| CN | 106298811 A | 1/2017 |
| CN | 111258140 A | 6/2020 |

* cited by examiner

DISPLAY SUBSTRATE, DISPLAY PANEL AND DISPLAY APPARATUS

CROSS-REFERENCE TO RELATED APPLICATIONS

This application claims the priority to the Chinese patent application No. 202010130210.8, filed on Feb. 28, 2020, the entire contents of which are incorporated herein by reference.

TECHNICAL FIELD

The present disclosure belongs to the field of display technology, and in particular, relates to a display substrate, a display panel and a display apparatus.

BACKGROUND

A display apparatus includes a common electrode circuit, and the common electrode circuit includes a base, a plurality of common electrodes, and a plurality of common electrode lines. The plurality of common electrodes are distributed on the base in an array, the plurality of common electrode lines extend along a row direction, and each common electrode line is connected to a corresponding row of the common electrodes, and the common electrode line and the common electrode are bridged by a conductive connection portion.

In a conventional common electrode circuit, Indium Tin Oxide (ITO) is typically used as a material of the conductive connection portion to connect a common electrode to a corresponding common electrode line. However, the excessively high resistivity of Indium Tin Oxide (ITO) will result in a greater loss of electric signals and therefore a larger voltage difference between the common electrodes, thereby affecting the uniformity of the display panel and reducing the quality of the displayed picture.

SUMMARY

The present disclosure provides a display substrate, a display panel and a display apparatus.

The display substrate includes: a base; a plurality of common electrodes distributed on the base in an array; and a plurality of common electrode lines extending along a row direction, each of the plurality of common electrode lines is connected to a corresponding row of the common electrodes, the common electrode line is connected to the common electrode through a conductive connection portion, and the conductive connection portion includes conductive structures stacked on top of one another in a plurality of layers.

Since in the display substrate provided in the present disclosure, the conductive connection portion, which bridges the common electrode and the common electrode line, includes the conductive structures stacked on top of one another in the plurality of layers, the resistance of the conductive connection portion can be reduced, and therefore the resistance between the common electrode and the common electrode line can be reduced, thereby reducing the voltage difference between the common electrodes in the display substrate and improving the uniformity of the common voltage therein.

In one embodiment, the display substrate further includes a plurality of pixel units, each of which includes a thin-film transistor and a pixel electrode; and the conductive structures in the plurality of layers includes a first conductive structure and a second conductive structure, the first conductive structure is disposed in a same layer as a source electrode and a drain electrode of the thin-film transistor, and is made of a same material as the source electrode and/or drain electrode; and the second conductive structure is disposed in a same layer as the pixel electrode, and is made of a same material as the pixel electrode.

In one embodiment, the display substrate further includes a plurality of gate lines and a plurality of data lines; the plurality of gate lines cross over the plurality of data lines to define the plurality of pixel units; and an interlayer insulation layer is disposed between the plurality of gate lines and the plurality of data lines, the plurality of common electrode lines and the plurality of gate lines extend along a same direction, are disposed on a same layer, and are made of a same material.

In one embodiment, in the display substrate provided in the present disclosure, a material of the second conductive structure includes Indium Tin Oxide (ITO).

In one embodiment, in the display substrate provided in the present disclosure, each of the plurality of pixel electrodes has a plurality of slits, and each of the plurality of common electrodes includes a plurality of strip-shaped sub-electrodes disposed at intervals, each of the plurality of common electrodes corresponds to a respective one of the plurality of pixel electrodes, and an orthographic projection of the strip-shaped sub-electrode of each of the plurality of common electrodes on the base overlaps with an orthographic projection of a corresponding slit of a corresponding pixel electrode on the base.

In one embodiment, in the display substrate provided in the present disclosure, an interlayer insulation layer and/or a gate insulation layer are/is included between the plurality of common electrodes and the plurality of common electrode lines, and the plurality of common electrode lines are disposed on a side of the plurality of common electrodes proximal to the base; and the conductive connection portion connects each of the plurality of common electrodes with a corresponding common electrode line of the plurality of common electrode lines through a via disposed in the interlayer insulation layer and/or gate insulation layer.

In one embodiment, the interlayer insulation layer extends between the pixel electrode and the corresponding common electrode; the conductive connection portion further includes a first connection portion that is disposed in a via in an interlayer insulation layer disposed on the common electrode and is in contact with the common electrode, and a second connection portion that is disposed in a via in an interlayer insulation layer disposed on the common electrode line and is in contact with the common electrode line; and at least one of the first connection portion and the second connection portion includes a via, which includes a first portion and a second portion, and a depth of the first portion is greater than that of the second portion.

In one embodiment, in the display substrate provided in the present disclosure, an area of an orthographic projection of the first portion on the base is one quarter of an area of an orthographic projection of the via on the base.

In one embodiment, the display substrate further includes a via in a portion of the pixel electrode overlapping with the drain electrode in a direction perpendicular to the base, the via includes a first portion and a second portion, and a depth of the first portion is greater than that of the second portion. For example, an area of an orthographic projection of the first portion on the base is one quarter of an area of an orthographic projection of the via on the base.

In one embodiment, the display substrate further includes a buffer layer which is disposed on the base, and the plurality of common electrode lines and the plurality of gate lines are disposed on the buffer layer, and the first conductive structure includes an end portion connected to and in contact with the corresponding common electrode line, the end portion including a first portion located on the buffer layer and a second portion located on the gate line and connected to the first portion.

In one embodiment, a gate line is disposed between a common electrode line and a corresponding row of common electrodes connected to the common electrode line, and the first portion is located on a side of the common electrode proximal to the gate line.

In one embodiment, the display substrate further includes a buffer layer disposed on the base, a gate electrode disposed on the buffer layer, a gate insulation layer disposed on the gate electrode, and an active layer disposed on the gate insulation layer, and the drain electrode includes a first portion disposed on the gate insulation layer and a second portion disposed on the active layer; and the pixel electrode includes a first portion covering the drain electrode and a second portion located on a surface of the gate insulation layer.

Correspondingly, the present disclosure further provides a display panel including the above-mentioned display substrate.

Correspondingly, the present disclosure further provides a display apparatus including the above-mentioned display panel.

DETAILED DESCRIPTION OF EMBODIMENTS

A further detailed description is hereinafter given to the present disclosure with reference to accompanying drawings so as to make the object, technical solutions and merits of the present disclosure more clear. Apparently, the described embodiments are only a part, but not all, of embodiments of the present disclosure. On the basis of the embodiments described in the present disclosure, other embodiments obtained by a person skilled in the art without any inventive work all fall within the protection scope of the present disclosure.

The shape and size of each member in the drawings are not intended to reflect a real scale, but, rather, are used for facilitating the understanding of the contents in the embodiments of the present disclosure.

Unless otherwise defined, technical terms or scientific terms used in the present disclosure should have the ordinary meanings that could be understood by a person skilled in the art to which the present disclosure pertains. The terms "first", "second", and the like used in the present disclosure are not intended to indicate any order, quantity, or importance, but rather are used for distinguishing one element from another. Similarly, the term "one", "an/a", "the" or the like is not intended to indicate any limitation on the quantity, but rather are used for indicating the presence of at least one entity. The term "comprising", "comprises", "including", "includes" or the like means that the element or item preceding the word comprises the element or item listed after the word and the equivalent thereof, but do not exclude the presence of other elements or items. The term "connected", "coupled" or the like is not restricted to a physical or mechanical connection, but may include an electrical connection, whether direct or indirect. The terms "upper", "lower", "left", "right" and the like are used merely to indicate relative positional relationships, and when the absolute position of the object being described is changed, these relative positional relationships may also be changed accordingly.

Figure 1:
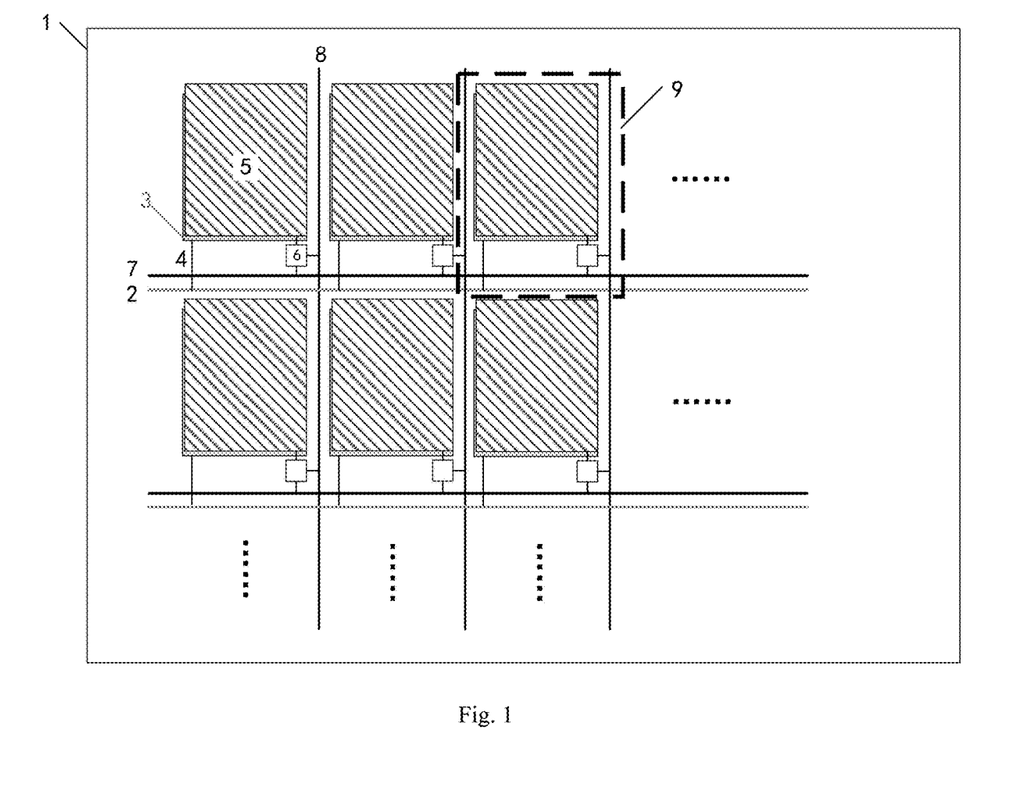
FIG. 1 is a top view of a structure of a display substrate provided in some embodiments of the present disclosure.
Figure 2:
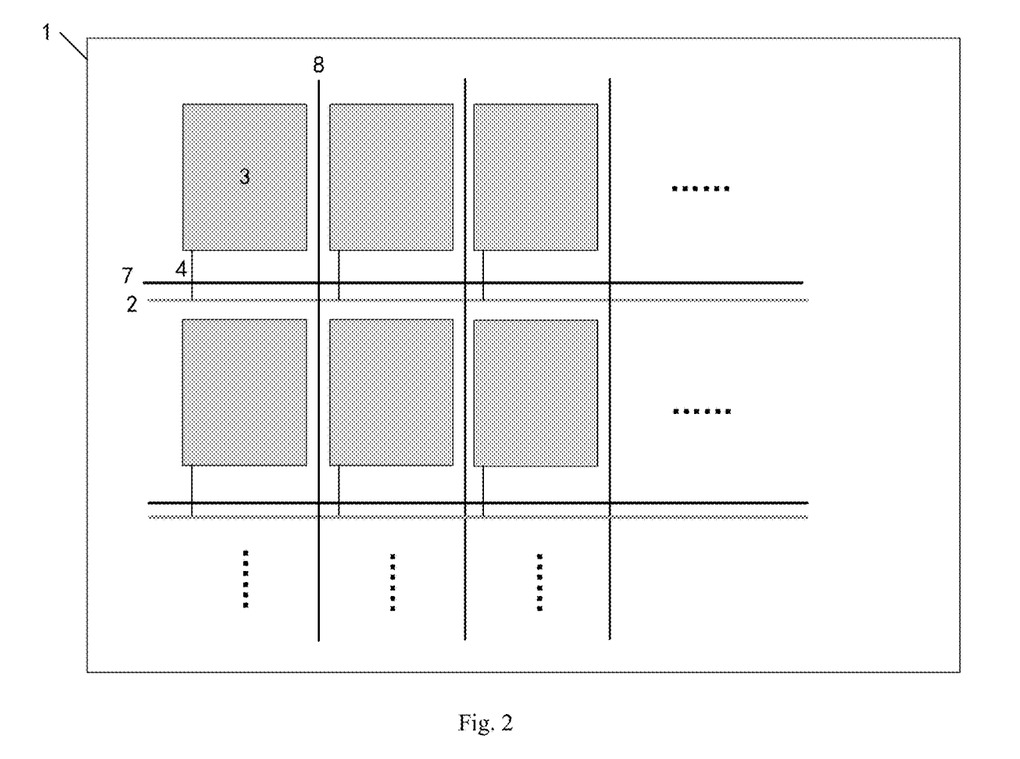
FIG. 2 is a top view of a structure of common electrodes and common electrode lines in a display substrate provided in some embodiments of the present disclosure.
Figure 3:
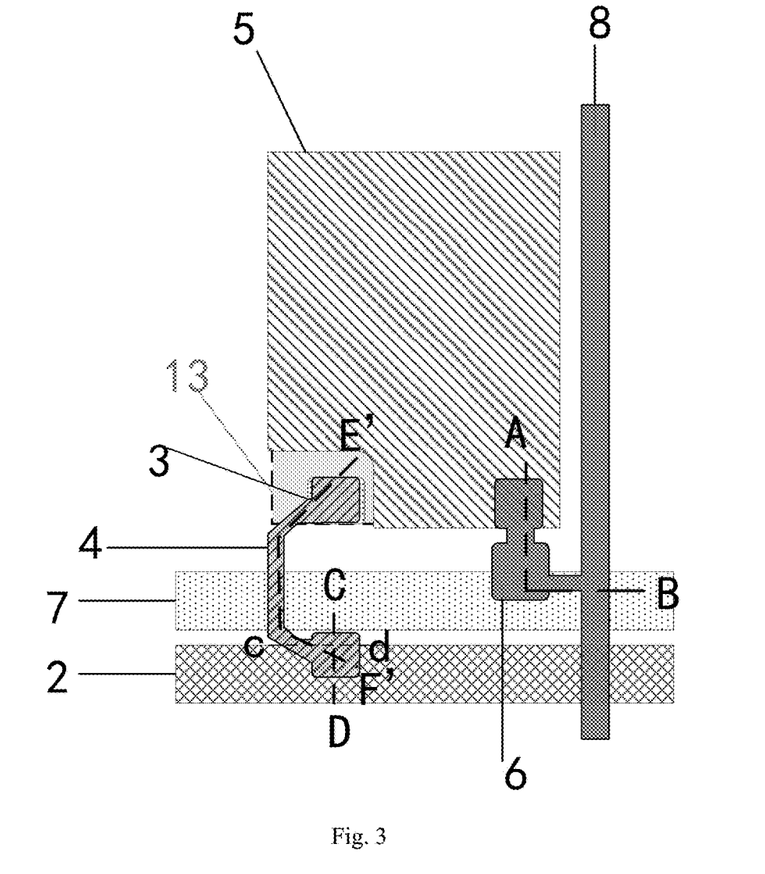
FIG. 3 is a schematic diagram of a structure of a portion of a pixel unit in a display substrate provided in the embodiments of the present disclosure.

As shown in FIGS. 1-3, this embodiment provides a display substrate including: a base 1, a plurality of common electrode lines 2, a plurality of common electrodes 3, a plurality of gate lines 7, a plurality of data lines 8, and a plurality of pixel units 9. FIG. 1 is a top view of the display substrate provided in this embodiment, FIG. 2 is a top view of the common electrodes and the common electrode lines in the display substrate with the pixel units removed, and FIG. 3 is a schematic diagram of a portion of the pixel unit 9 in FIG. 1.

Specifically, with reference to FIGS. 1 and 3, the base 1 includes a plurality of pixel units 9 distributed thereon in an array, each of which includes a pixel electrode 5 and a thin-film transistor 6. The plurality of gate lines 7 extend along a row direction, the plurality of data lines 8 extend along a column direction, and the plurality of gate lines 7 cross over the plurality of data lines 8 to define the plurality of pixel units 9. Each of the gate lines 7 is connected to a corresponding row of pixel units 9, and each of the data lines 8 is connected to a corresponding column of pixel units 9. Specifically, in a row of pixel units 9 connected to a gate line 7, a thin-film transistor 6 of each pixel unit 9 is connected to a pixel electrode 5. As a switching device of the pixel unit 9, the thin-film transistor 6 is turned on or off under the control of the gate line 7. If a thin-film transistor 6 in a pixel unit 9 is turned on, a voltage signal over a data line 8 connected to the pixel unit 9 can be transmitted to a pixel electrode 5 in the pixel unit 9, whereas if the thin-film transistor 6 is turned off, the voltage signal over the data line 8 can be blocked from being transmitted to the pixel electrode 5.

Specifically, with reference to FIGS. 2 and 3, the plurality of common electrodes 3 are distributed on the base 1 in an array, each of the plurality of common electrodes 3 corresponds to a respective one of the pixel electrodes 5 in the plurality of pixel units 9, and the common electrode 3 is disposed on a side of the pixel unit 5 proximal to the base 1. The plurality of common electrode lines 2 extend along the row direction, each of the common electrode lines 2 is connected to a corresponding row of common electrodes 3, and the common electrode line 2 inputs a common voltage (Vcom) to the corresponding row of common electrodes 3. Specifically, the common electrode line 2 may be connected to the common electrode 3 through a conductive connection portion 4 including conductive structures stacked on top of one another in a plurality of layers.

Since in the display substrate provided in this embodiment, the conducive connection portion 4, which bridges the common electrode 3 and the common electrode line 2, includes the conductive structures stacked on the top of one another in the plurality of layers, the resistance of the conductive connection portion 4 can be reduced, and therefore the resistance between the common electrode 3 and the common electrode line 2 can be reduced. Therefore, when the common electrode line 2 transmits a common voltage signal to the common electrode 3 through the conductive connection portion 4, the loss of the common voltage signal is eliminated, thereby reducing the voltage difference between the common electrodes 3 in the display substrate and improving the uniformity of the common voltage therein.

Figure 4A:
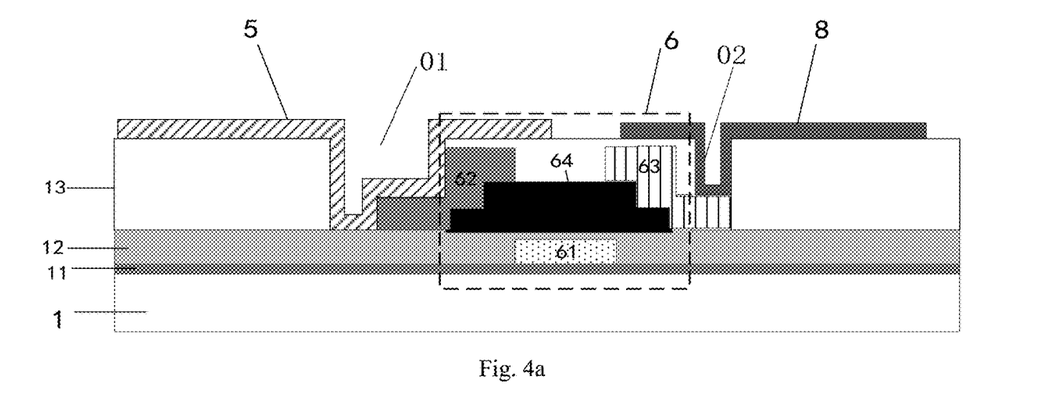
FIG. 4a is a cross-sectional view of a display substrate provided in some embodiments of the present disclosure along an A-B line in FIG. 3.
Figure 4B:
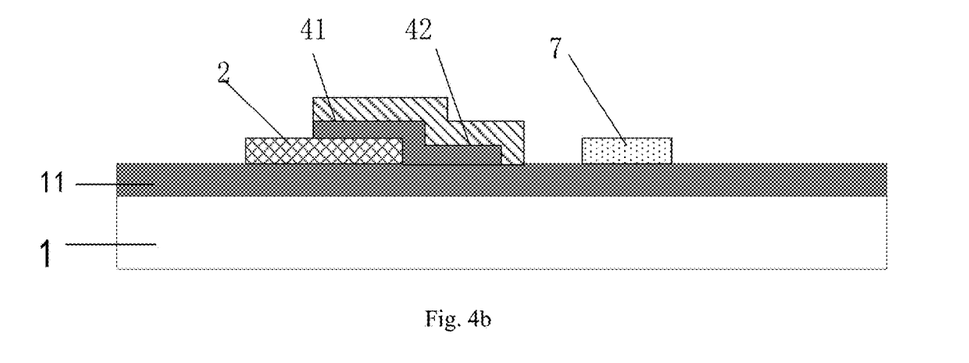
FIG. 4b is a cross-sectional view of a display substrate provided in some embodiments of the present disclosure along a C-D line in FIG. 3.
Figure 5:
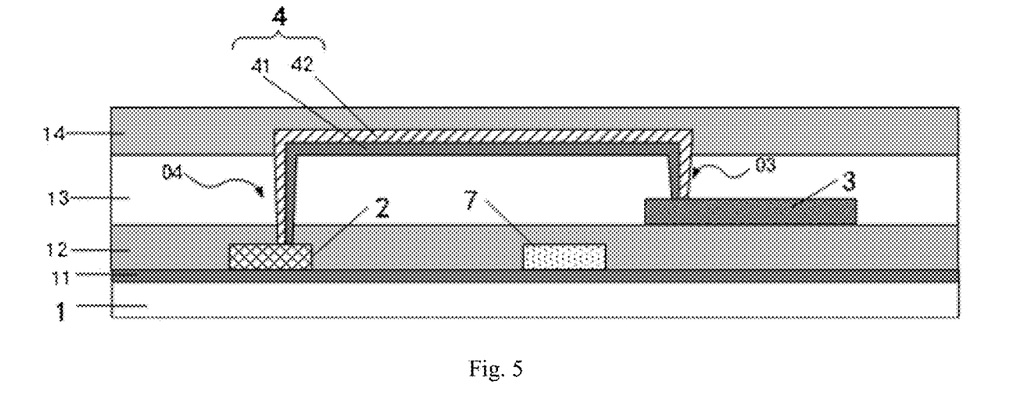
FIG. 5 is a cross-sectional view of a display substrate provided in some embodiments of the present disclosure along a E'-F' line in FIG. 3.

Further description will be made to the display substrate provided in this embodiment shown in FIGS. 3, 4a, 4b and 5. FIG. 4a is a cross-sectional view of the pixel unit taken along the A-B line in FIG. 3, FIG. 4b is a cross-sectional view of the pixel unit taken along the C-D line in FIG. 3, and FIG. 5 is a cross-sectional view of the pixel unit taken along the E'-F' line in FIG. 3. With reference to FIGS. 4A and 4b, in the display substrate provided in this embodiment, a buffer layer 11 is disposed on a side of the base 1 proximal to the pixel electrode 5, and the thin-film transistor 6 is disposed on a side of the buffer layer 11 proximal to the pixel electrode 5. The thin-film transistor 6 may include a plurality of film layers, for example, a gate electrode 61 disposed on a side of the buffer layer 11 distal to the base 1; an active layer 64 on top of the gate electrode 61; a gate insulation layer 12 between the active layer 64 and the gate electrode 61; a drain electrode 62 and a source electrode 63 disposed on a side of the active layer 64 distal to the gate insulation layer 12, and both being disposed on the same layer; and an interlayer insulation layer 13 between the drain electrode 62 and the source electrode 63. The active layer 64 is made of a semiconductor material, for example, amorphous silicon, polysilicon, organic semiconductor materials or the like, which is not limited herein.

Further, with reference to FIGS. 4a, 4b and 5, in the display substrate provided in this embodiment, the pixel electrode 5 is connected to the drain electrode 62 of the thin-film transistor 6 through a first via 01 disposed in the interlayer insulation layer 13; the data line 8 is connected to the source electrode 63 of the thin-film transistor 6 through a second via 02 disposed in the interlayer insulation layer 13; the gate line 7 is connected to the gate electrode 61 of the thin-film transistor 6; and in this embodiment, the gate electrode 61 and the gate line 7 are disposed in a same layer. The gate line 7 crosses over the data line 8, and the interlayer insulation layer 13 is disposed between the gate line 7 and the data line 8 so as to provide isolation between signals over the gate line 7 and the data line 8 and prevent crosstalk between the signals. A passivation layer may be further disposed on a side of the pixel electrode 5 distal to the base 1 so as to protect various devices in the display substrate.

It should be noted that, in the display substrate provided in this embodiment, as long as the data line 8 is connected to the source electrode 63 in the thin-film transistor 6 and the gate line 7 is connected to the gate electrode 61 in the thin-film transistor 6, the data line 8 and the gate line 7 may be disposed between any two film layers in the display substrate, which is not limited herein.

Further, with reference to FIGS. 4a and 5, in the display substrate provided in this embodiment, the conductive connection portion 4 may include conductive structures in a plurality of layers, for example, the conductive connection portion 4 may include conductive structures in two layers, that is, a first conductive structure 41 and a second conductive structure 42, wherein the first conductive structure 41 may be disposed in a same layer as the source electrode 63 and the drain electrode 62 in the thin-film transistor 6, and the first conductive structure 41 may be made of a same material as the source electrode 63 and the drain electrode 62; in other words, the first conductive structure 41 may be formed together with the source electrode 63 and the drain electrode 62 in the same step by a patterning process, and thus, it is possible to avoid the increased difficulty in the procedure of fabricating the display substrate. And also, the second conductive structure 42 may be disposed on the layer where the pixel electrode 5 is disposed, and may be made of the same material as that of the pixel electrode 5; in other words, the second conductive structure 42 may be fabricated together with the pixel electrode 5 in the same step by a patterning process, and thus, it is possible to further avoid the increased difficulty in the procedure of fabricating the display substrate. The conductive connection portion 4 is formed by stacking the second conductive structure 42, which is arranged on the same layer as the pixel electrode 5, on the first conductive structure 41, which is arranged on the same layer as the drain electrode 62 and the source electrode 63. The resistivity of the conductive connection portion 4 can be reduced by selecting the materials of the first conductive structure 41 and the second conductive structure 42, thereby reducing the resistance between the common electrode 3 and the common electrode line 2. Thus, when the common electrode line 2 inputs the common voltage signal to the common electrode 3 through the conductive connection portion 4, the loss of the common voltage signal is eliminated, thereby reducing the voltage difference between the common electrodes 3 in the display substrate and improving the uniformity of the common voltage therein.

In addition, as shown in FIG. 4a, during the formation of the drain electrode 62 and the pixel electrode 5 that is on top of and in contact with the drain electrode 62, a through-hole 01 that substantially conforms with the drain electrode 62 may be formed in the interlayer insulation layer 13 with at least a portion of the gate insulation layer 12 exposed, which will produce a stepped through-hole, so that the pixel electrode 5 is formed to have at least two planes with different heights in the through-hole 01, and thus, a via with different depths can be formed therein. Similarly, as shown in FIG. 4b, during the formation of the double-layered conductive connection portion 4, with reference to FIG. 3, the first conductive structure 41 may be formed on the edges of the common electrode line 2, that is, one portion of the first conductive structure is formed on the buffer layer 11, and the other portion thereof is formed on the common electrode line 2. Thus, a stepped through-hole will be formed between the common electrode line 2 and the gate line 7, so that the second conductive structure 42 that conforms with the first conductive structure 41 may be formed, and thus, a via with different depths may be formed between the gate line 7 and the common electrode line 2. These vias with different depths will facilitate flow of polyimide liquid (PI liquid) during the formation of an alignment layer (PI layer), as described below. This is because a via with different depths can make the PI liquid have different surface tensions in a deep-hole portion and a shallow-hole portion of the via and create a pressure difference inside the PI liquid around the via. When the PI liquid flows through the via, it will flow into the deep-hole portion thereof. Thus, it is possible to prevent the PI liquid from accumulating around the via and increase the fluidity of the PI layer, thereby ensuring the uniformity of the PI layer.

In other words, in the display substrate of the present disclosure, a metal layer of the source electrode/the drain electrode and a transparent conductive layer of the pixel electrode are formed, and at the same time, the conductive connection portion including the first conductive structure and the second conductive structure is formed. At a position of a step, a structure crossing the step can be formed so that the top surface of the formed structure also constitutes a stepped structure and the via thus formed has different depths. Therefore, the fluidity of the PI liquid can be increased during the formation of the alignment layer at a later stage, thereby ensuring the uniformity of the PI layer.

Optionally, the source electrode 63 and the drain electrode 62 in the thin-film transistor may include various types of materials, for example, any one of silver (Ag), copper (Cu) and aluminum (Al). Since the material of the first conductive structure 41 may be the same as that of the source electrode 63 and the drain electrode 62, it may be any one of silver (Ag), copper (Cu) and aluminum (Al). The material of the pixel electrode 5 may include various types of transparent semiconductor materials, for example, Indium Tin Oxide (ITO). Since the material of the second conductive structure 42 may be the same as that of the pixel electrode 5, it may be ITO. Of course, the first conductive structure 41 and the second conductive structure 41 may as well be made of other materials, which are not limited herein.

It should be noted that the conductive connection portion 4 may include any number of conductive structures, which are stacked on top of one another to form the conductive connection portion 4 so as to reduce the resistance thereof. The specific number of the conductive structures in the conductive connection portion 4 may be set as needed, and is not limited herein.

Further, with reference to FIG. 5, the common electrode line 2 and the gate line 7 may extend along the same direction, be disposed on the same layer, and be made of the same material. The common electrode line 2 may be formed together with the gate line 7 in a same step by a patterning process, and thus, it is possible to avoid the increased difficulty in the procedure of fabricating the display substrate.

It should be noted that in the display substrate provided in this embodiment, the structure of the thin-film transistor 6 may include various types, and the position of the thin-film transistor 6 relative to the pixel electrode 5, the data line 8 and the gate line 7 may be set as needed. The examples shown in the figures are only for illustrative purposes, but not to impose any limitation on the embodiments of the present disclosure.

Optionally, in the display substrate provided in this embodiment, the position of the common electrode 3 relative to the pixel electrode 5 may be set in various manners. In an example, the common electrode 3 may be disposed on a side of the pixel electrode 5 proximal to the base 1. In an example, the common electrode 3 may be disposed on the layer where the pixel electrode 5 is disposed. In an example, the common electrode 3 may be disposed opposite to the pixel electrode 5, that is, the common electrode 3 and the pixel electrode 5 may be disposed on a color film substrate and an array substrate, respectively, and the color film substrate and the array substrate are disposed opposite to each other. Specifically, the position of the common electrode 3 relative to the pixel electrode 5 may be set as needed, and is not limited herein. In various settings of the positions of the common electrode 3 and the pixel electrode 5, the common electrode line 2 and the common electrode 3 can be connected through the conductive connection portion 4. In this embodiment, description is made by using the example in which the common electrode 3 is disposed on a side of the pixel electrode 5 proximal to the base 1. The interlayer insulation layer 13 is between the common electrode 3 and the pixel electrode 5 to provide isolation between signals thereof and prevent crosstalk between the signals.

Figure 6:
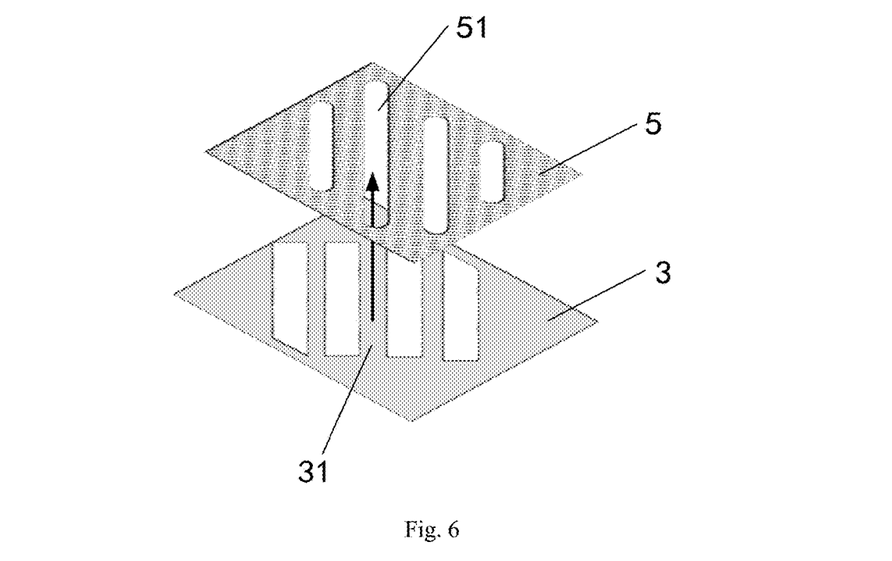
FIG. 6 is a schematic diagram of a structure of a pixel electrode and a common electrode in a display substrate provided in some embodiments of the present disclosure.

Further, as shown in FIG. 6, each of the plurality of common electrodes 3 corresponds to a respective one of the plurality of pixel electrodes 5, and the plurality of pixel electrodes 5 and the plurality of common electrodes 3 may include various types of electrodes, for example, block-shaped electrodes, strip-shaped electrodes, slit electrodes, comb-shaped electrodes, planar electrodes or the like. Taking the slit electrode as the pixel electrode 5 for example, the pixel electrode may have a plurality of slits 51, and correspondingly, the common electrode 3 may include a plurality of strip-shaped sub-electrodes 31 disposed at intervals. The strip-shaped sub-electrodes of the common electrode 3 are located on the base 1 and at positions opposite to the slits 51 of the pixel electrode 5, respectively. That is, an orthographic projection of the strip-shaped sub-electrode 31 of the common electrode 3 on the base 1 overlaps with an orthographic projection of the corresponding slit 51 of the pixel electrode 5 on the base 1, so that electric field lines generated by the common electrode 3 after a voltage is applied thereto may pass through the slit 51 of the pixel electrode 5 to maintain an electric field between the pixel electrode 5 and the common electrode 3. Of course, the common electrode 3 and the pixel electrode 5 may be other types of electrodes, which is not limited herein.

Further, with reference to FIGS. 3-5, in the display substrate provided in this embodiment, the common electrode 3 and the common electrode line 2 are located at different layers; for example, with reference to FIGS. 4a and 5, the common electrode 3 is located below the pixel electrode 5, and disposed in the interlayer insulation layer 13; the common electrode line 2 and the gate line 7 are disposed on the same layer, and the common electrode line 2 is disposed in the gate insulation layer 12; the interlayer insulation layer 13 and/or the gate insulation layer 12 are/is included between the common electrode 3 and the common electrode line 2; and the common electrode line 2 is disposed on a side of the common electrode 3 proximal to the base. One end of the conductive connection portion 4 is connected to the common electrode 3 through a third via 03 disposed in the interlayer insulation layer 13, and the other end of the conductive connection portion 4 is connected to the common electrode line 2 through a fourth via 04 disposed in the interlayer insulation layer 13 and the gate insulation layer 12, so that the common electrode 3 and the common electrode line 2 are connected to each other.

Figure 7:
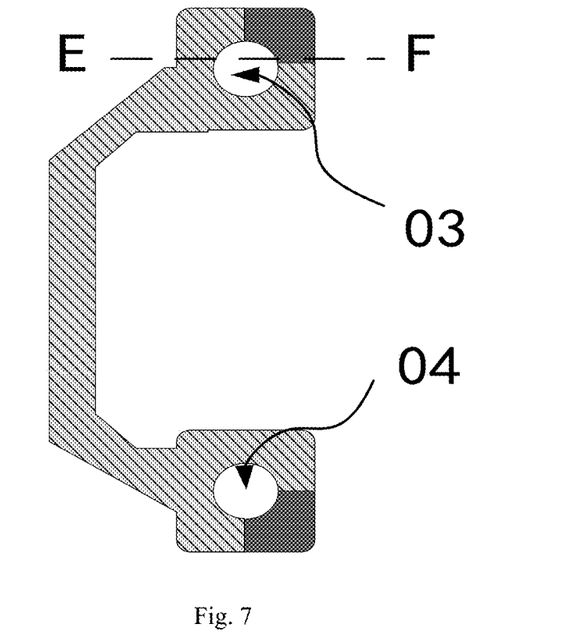
FIG. 7 is a schematic diagram of a structure of vias in a conductive connection portion in a display substrate provided in some embodiments of the present disclosure.
Figure 8:
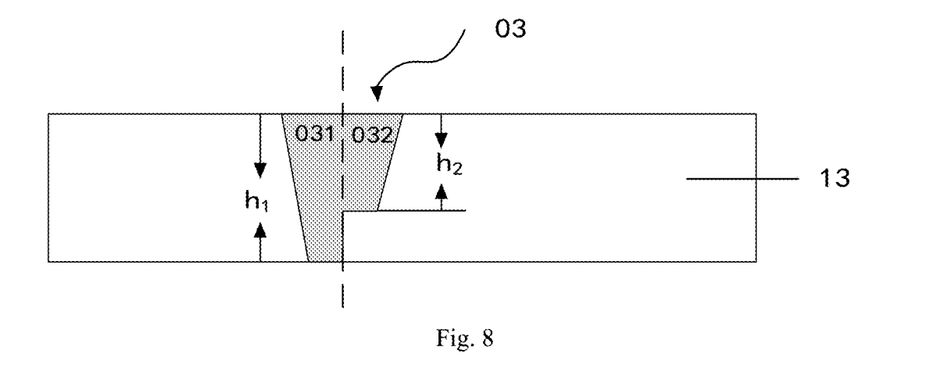
FIG. 8 is a cross-sectional view of a via in a conductive connection portion in a display substrate provided in some embodiments of the present disclosure along a E-F line in FIG. 7.
Figure 10:
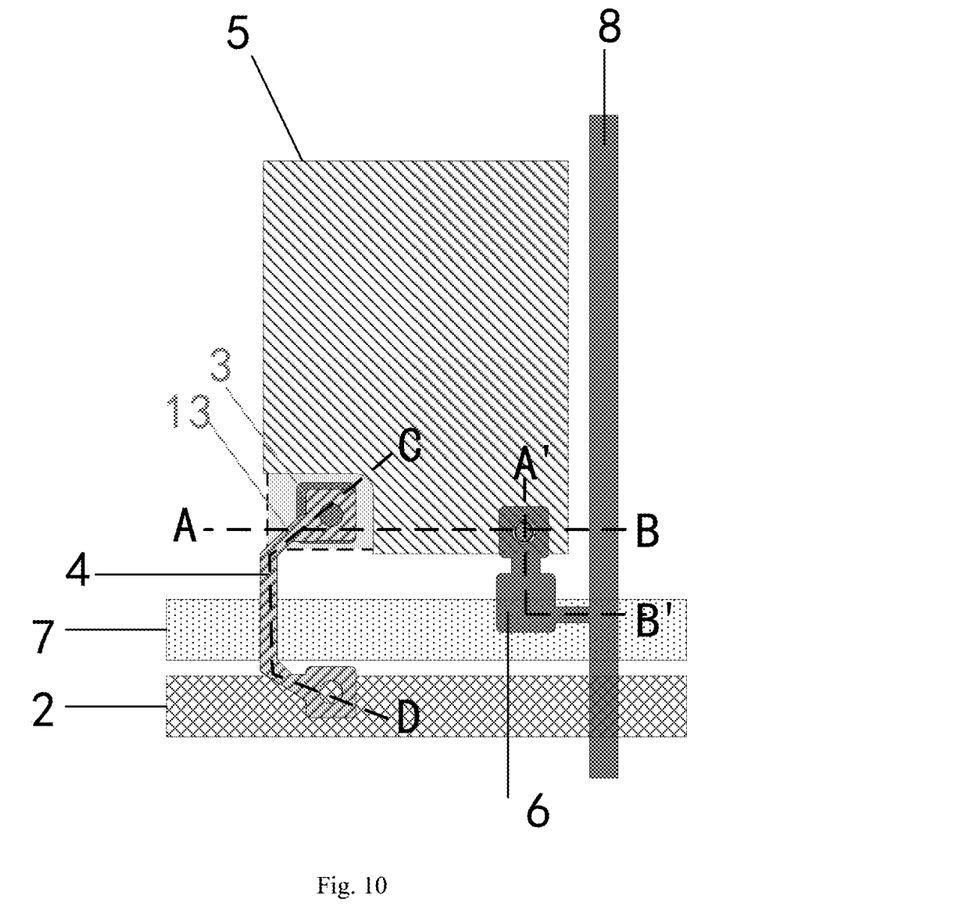
FIG. 10 is a schematic diagram of a structure of a portion of a pixel unit in a display substrate provided in some embodiments of the present disclosure.

Further, after the structure as shown in FIG. 3 is formed, vias can be opened in the respective portions of the conductive connection portion 4 disposed on the common electrode 3 and on the common electrode line 2. In addition, a via may alternatively be opened in the drain electrode of the thin-film transistor 6, as shown in FIG. 10. With reference to FIGS. 7 and 8, FIG. 8 is a cross-sectional view of the conductive connection portion 4 taken along the E-F line in FIG. 7. The third via 03 and the fourth via 04 are vias with different depths. Taking the third via 03 for example, the third via 03 may include a first portion 031 and a second portion 032, a depth $h_1$ of the first portion 031 may be greater than a depth $h_2$ of the second portion 032. Hereinafter, the first portion 031 is referred to as "a deep-hole portion", and the second portion 032 is referred to as "a shallow-hole portion". When the display substrate provided in this embodiment is applied to the display apparatus, there will be a liquid crystal layer above the display substrate. To control the orientation of liquid crystals, an alignment (PI) layer needs to be disposed on an outermost side of the display substrate distal to from the base 1. During the formation of the PI layer, the PI liquid needs to be coated on the display substrate to form the PI layer. During the coating process, the PI liquid may flow into the via in the display substrate. By making the via in the display subtract have different depths, the PI liquid can be caused to have different surface tensions in a deep-hole portion and a shallow-hole portion of the via, and a pressure difference can be created inside the PI liquid around the via. When the PI liquid flows through the via, it will flow into the deep-hole portion of the via, and thus, it is possible to prevent the PI liquid from accumulating around the via and increase the fluidity of the liquid PI, thereby ensuring the uniformity of the PI layer.

Optionally, in the above-mentioned display substrate provided in this embodiment, the fluidity of the PI liquid can be controlled by adjusting the proportion of the first portion to the second portion in the via. For example, as shown in FIG. 7, the first portion (that is, the deep-hole portion corresponding to the gray area around the via 03 in FIG. 7) accounts for one-quarter of the via, and the second portion (that is, the shallow-hole portion corresponding to the stripped area around the via 03 in FIG. 7) accounts for the remaining three-quarters thereof, that is, the area of the orthographic projection of the first portion of the via on the base 1 is equal to one-quarter of the area of the orthographic projection of the entire via thereon. If the PI liquid flows through the via, it will flow into the first portion that accounts for one-quarter of the via, thereby preventing the liquid PI from accumulating around the via.

Figure 9:
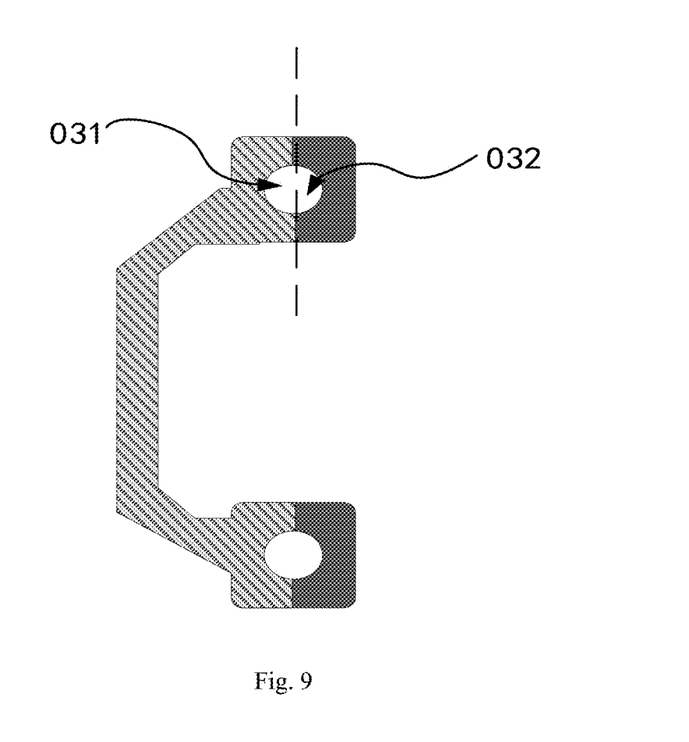
FIG. 9 is a schematic diagram of a structure of vias in a conductive connection portion in a display substrate provided in some embodiments of the present disclosure.

Optionally, as shown in FIG. 9, in the display substrate provided in this embodiment, the via may alternatively be a half-hole structure. In other words, the first portion 031 accounts for one half of the via, and the second portion 032 accounts for the other half thereof, that is, the respective areas of the orthographic projections of the first portion 031 and the second portion 032 of the via on the base 1 each account for one half of the area of the orthographic projection of the entire via thereon. If the PI liquid flows through the via, it will flow into the first portion 031 that accounts for one half of the via, thereby preventing the liquid PI from accumulating around the via.

As long as the formed structure can ensure that the common electrode and the corresponding common electrode line are electrically connected to each other through the conductive connection portion, the above-mentioned proportion will not be limited in the present disclosure.

It should be noted that in the display substrate provided in the embodiments of the present disclosure, the above-mentioned via with different depths can serve as any via between the film layers, for example, the first via 01, the second via 02, the third via 03 and the fourth via 04, thereby preventing the liquid PI from accumulating around the via in the display substrate and ensuring the uniformity of the PI layer.

Further, with reference to FIGS. 3 and 4a, the display substrate provided in the embodiments of the present disclosure includes a plurality of film layers (for example, the gate electrode 61, the gate insulation layer 12, the interlayer insulation layer 13, the drain electrode 62, the source electrode and the like), the common electrode 3 may be located between any two film layers in the display substrate, and the conductive connection portion 4 may make the common electrode 3 be connected to the common electrode line 2 through a via in the film layers between the common electrode 3 and the common electrode line 2. The via may be set to have the same structure as that of the above-mentioned via with different depths, which is not limited herein.

It should be noted that the display substrate provided in this embodiment may be fabricated by the processes using 5 or 6 masks, or may be alternatively fabricated by the processes using other possible number of masks. The examples shown in the figures are only for illustrative purposes, but not to impose any limitation on the embodiments of the present disclosure.

Correspondingly, this embodiment further provides a display panel including the above-mentioned display substrate. The display panel may be of any shapes. In the present embodiment, description will be made by using the example in which the display panel is of a rectangular shape.

Optionally, the display panel provided in this embodiment may include a Gate Driver On Array (GOA) circuit connected to the plurality of gate lines and used for driving the plurality of gate lines, and an X-Printed Circuit Board (X-PCB) disposed on an outside of the display panel and connected to the plurality of data lines through a Flexible Printed Circuit (FPC), and the X-PCB is used for driving the plurality of data lines and providing voltage signals to the plurality of data lines. Of course, in the display panel, a Gate Driver Integrated Circuit (G-IC) may alternatively be used for driving the plurality of data lines, which is not limited herein.

Correspondingly, this embodiment further provides a display apparatus including the above-mentioned display panel. The display apparatus may be any product or component having a display function, such as a mobile phone, a tablet computer, a television, a monitor, a notebook computer, a digital photo frame, a navigator or the like. It should be understood by a person skilled in the art that the display apparatus should have other necessary elements, which will not be repeated herein, and should not be construed as a limitation to the present disclosure.

It should be understood that, the above embodiments are merely exemplary embodiments for the purpose of illustrating the principle of the present disclosure, and the invention is not limited thereto. It will be apparent to a person skilled in the art that various changes and modifications can be made therein without departing from the spirit and scope of the present disclosure, and these are to be considered as the scope of the present disclosure.

What is claimed is:

1. A display substrate, comprising:
   a base;
   a plurality of common electrodes distributed on the base in an array; and
   a plurality of common electrode lines extending along a row direction, each of the plurality of common electrode lines connected to a corresponding row of common electrodes, wherein
   the common electrode line is connected to the common electrode through a conductive connection portion, the conductive connection portion comprising conductive structures stacked on top of one another in a plurality of layers;
   wherein the display substrate further comprises to plurality of gate lines which extend along substantially a same direction as the plurality of common electrode lines;
   a corresponding gate line of the plurality of gate lines is disposed between a common electrode line of the plurality of common electrode lines and a corresponding row of common electrodes connected to the corresponding common electrode line; and
   the conductive structures stacked on top of one another in a plurality of layers extend from a corresponding common electrode line of the plurality of common electrode lines and span across a corresponding gate line of the plurality of gate lines to be connected to a corresponding common electrode of the plurality of common electrodes, and all the plurality of layers of the conductive structures continuously extend from the corresponding common electrode line to the corresponding common electrode, and orthographic projections of all the plurality of layers of the conductive structures on the base overlap with each other.

2. The display substrate according to claim 1, further comprising: a plurality of pixel units, wherein each of the plurality of pixel units comprises a thin-film transistor and a pixel electrode; and
   the conductive structures in the plurality of layers comprise a first conductive structure and a second conductive structure, wherein the first conductive structure is disposed in a same layer as a source electrode and a drain electrode of the thin-film transistor, and is made of a same material as the drain electrode and the source electrode, and the second conductive structure is disposed in a same layer as the pixel electrode, and is made of a same material as the pixel electrode.

3. The display substrate according to claim 2, further comprising: a plurality of data lines; wherein
   the plurality of gate lines cross over the plurality of data lines to define the plurality of pixel units; and an interlayer insulation layer is disposed between the plurality of gate lines and the plurality of data lines; and
   the plurality of common electrode lines and the plurality of gate lines are disposed in a same layer, and are made of a same material.

4. The display substrate according to claim 3, wherein the interlayer insulation layer extends between the pixel electrode and the corresponding common electrode;
   the conductive connection portion further comprises a first connection portion that is disposed in a via in the interlayer insulation layer disposed on the common electrode and is in contact with the common electrode, and a second connection portion that is disposed in a via in the interlayer insulation layer disposed on the common electrode line and is in contact with the common electrode line; and
   at least one of the first connection portion and the second connection portion comprises a via, which comprises a first portion and a second portion, a depth of the first portion being greater than that of the second portion.

5. The display substrate according to claim 4, wherein an area of an orthographic projection of the first portion on the base is one quarter of an area of an orthographic projection of the via on the base.

6. The display substrate according to claim 3, further comprising a buffer layer on the base,
   wherein the plurality of common electrode lines and the plurality of gate lines are disposed on the buffer layer, and
   the first conductive structure comprises an end portion that is connected to and in contact with the corresponding common electrode line, and the end portion comprises a first portion located on the buffer layer, and a second portion located on the gate line and integrated with the first portion as a single piece.

7. The display substrate according to claim 6, wherein the first portion is located on a side of the common electrode line proximal to the gate line.

8. The display substrate according to claim 2, wherein a material of the second conductive structure comprises Indium Tin Oxide.

9. The display substrate according to claim 2, wherein
   each of the plurality of the pixel electrodes has a plurality of slits, and each of the plurality of the common electrodes comprises a plurality of strip-shaped sub-electrodes disposed at intervals, and
   the plurality of common electrodes correspond to the plurality of pixel electrodes one by one, and an orthographic projection of each of the strip-shaped sub-electrodes of each of the plurality of common electrodes on the base overlaps with an orthographic projection of a corresponding slit of a corresponding pixel electrode of the plurality of pixel electrodes on the base.

10. The display substrate according to claim 2, further comprising a via in a portion of the pixel electrode overlapping with the drain electrode in a direction perpendicular to the base,
    wherein the via comprises a first portion and a second portion, and a depth of the first portion is greater than that of the second portion.

11. The display substrate according to claim 10, wherein an area of an orthographic projection of the first portion on the base is one quarter of an area of an orthographic projection of the via on the base.

12. The display substrate according to claim 2, further comprising: a buffer layer disposed on the base, a gate electrode disposed on the buffer layer, a gate insulation layer disposed on the gate electrode, and an active layer disposed on the gate insulation layer, wherein
    the drain electrode comprises a first portion disposed on the gate insulation layer, and a second portion disposed on the active area and integrated with the first portion as a single piece; and
    the pixel electrode comprises a first portion covering the drain electrode, and a second portion located on the gate insulation layer.

13. The display substrate according to claim 1, wherein the plurality of common electrodes and the plurality of common electrode lines are located in different layers, at least one of an interlayer insulation layer and a gate insulation layer Weis included between the plurality of common electrodes and the plurality of common electrode lines, and the plurality of common electrode lines are disposed on a side of the plurality of the common electrodes proximal to the base; and     the conductive connection portion connects each of the plurality of common electrodes with a corresponding common electrode line of the plurality of common electrode lines through a via in the at least one of the interlayer insulation layer and the gate insulation layer.

14. A display panel, comprising the display substrate according to claim 1.

15. A display apparatus, comprising the display panel according to claim 14.

16. The display panel according to claim 14, further comprising: a plurality of pixel units, wherein each of the plurality of pixel units comprises a thin-film transistor and a pixel electrode; and     the conductive structures in the plurality of layers comprise a first conductive structure and a second conductive structure, wherein the first conductive structure is disposed in a same layer as a source electrode and a drain electrode of the thin-film transistor, and is made of a same material as the drain electrode and the source electrode, and the second conductive structure is disposed in a same layer as the pixel electrode, and is made of a same material as the pixel electrode.

17. The display panel according to claim 16, further comprising: a plurality of data lines; wherein     the plurality of gate lines cross over the plurality of data lines to define the plurality of pixel units; and an interlayer insulation layer is disposed between the plurality of gate lines and the plurality of data lines; and the plurality of common electrode lines and the plurality of gate lines are disposed in a same layer, and are made of a same material.

18. The display panel according to claim 16, wherein a material of the second conductive structure comprises Indium Tin Oxide.

19. The display panel according to claim 16, wherein each of the plurality of the pixel electrodes has a plurality of slits, and each of the plurality of the common electrodes comprises a plurality of strip-shaped sub-electrodes disposed at intervals, and     the plurality of common electrodes correspond to the plurality of pixel electrodes one by one, and an orthographic projection of each of the strip-shaped sub-electrodes of each of the plurality of common electrodes on the base overlaps with an orthographic projection of a corresponding slit of a corresponding pixel electrode of the plurality of pixel electrodes on the base.

20. The display panel according to claim 14, wherein the plurality of common electrodes and the plurality of common electrode lines are located in different layers, at least one of an interlayer insulation layer and a gate insulation layer aft is included between the plurality of common electrodes and the plurality of common electrode lines, and the plurality of common electrode lines are disposed on a side of the plurality of the common electrodes proximal to the base; and     the conductive connection portion connects each of the plurality of common electrodes with a corresponding common electrode line of the plurality of common electrode lines through a via in the at least one of the interlayer insulation layer and the gate insulation layer.

\* \* \* \* \*